X 140

X 150

INVENTORS
THOMAS L. MARIANI
ROBERT P. HIRSCHMANN
BY Elizabeth Hunter
ATTORNEY

United States Patent Office 3,455,841
Patented July 15, 1969

3,455,841
CHROMATOGRAPHIC COLUMN USING DIAMOND DEPOSITED ON CALCIUM FLUORIDE
Thomas L. Mariani, Clifton, and Robert P. Hirschmann, Parsippany-Troy Hills, N.J., assignors to Allied Chemical Corporation, New York, N.Y., a corporation of New York
Filed Mar. 4, 1966, Ser. No. 531,881
Int. Cl. B01d 53/02, 15/08
U.S. Cl. 252—441                                2 Claims

ABSTRACT OF THE DISCLOSURE

Composite, adherent mixture of particulate calcium fluoride and finely divided synthetic diamantiferous material useful in "gas-solid" chromatography.

---

Figure 1:

This invention relates to a chromatographic column and more particularly to a new column packing material for gas-solid partition chromatography.

It has been known in the past to separate gaseous mixtures into their individual components especially for purposes of purification or analysis, by passing the mixed gases or samples thereof in a stream of inert carrier gas such as helium through an elongated column packed with an inert solid substrate having deposited thereon a selective adsorbent liquid. The carrier gas is swept through the column under sufficient pressure to force the mixed gases along with it through the column. The adsorbent adsorbs the several components of the mixture and holds them with varying tenacity so that they are differentially released to the constantly flowing carrier gas, and thus the different components are retained for different lengths of time in the column and emerge at different times. Such a procedure wherein a liquid is used as the selective adsorbent is called "gas-liquid" chromatography.

The use of "gas-solid" chromatography, wherein the selective adsorbent is a solid, while presenting a number of operational advantages over the gas-liquid procedure, has not found wide application because of the absence of effective solid adsorbents. It is known to use active carbon as a solid adsorbent, but this material is unsatisfactory for many purposes, notably for the separation of reactive gases which, at elevated temperatures, tend to react with the active carbon. The carbon columns, moreover, cannot readily be regenerated by heat when they become blocked with more or less permanently adsorbed materials since the temperatures sometimes necessary for regeneration, e.g. Ca 500° C. or higher, tend to destroy the carbon surface, especially if air or other oxidizing materials are present.

In copending application of Thomas L. Mariani, Robert P. Hirschmann, Dennis A. Cupolo and Charles J. Peterman, Ser. No. 531,678 filed as of even date herewith, now U.S. Patent No. 3,345,804 granted Oct. 10, 1967, there is described a process for separating gaseous mixtures by passing such mixtures through a column comprising a synthetic diamantiferous material composed of polycrystalline aggregates of individual diamond particles, said aggregates having an average diameter not exceeding about 0.15 micron and a surface area between about 40 and about 400 square meters per gram and usually being made up of individual diamond crystallites of average particle diameter between about 50 A. and about 300 A., whereby at least one of the components of the gaseous mixture is separated from the remaining components.

In practicing the above process it was found that when the diamantiferous material above described was used as the sole solid material of the adsorbent column, it required substantially higher than usual pressures to propel the inert gas carrier and gas to be separated through even relatively short columns of the diamond material and provided relatively slow progress through the column. Dilution of the diamond with varying amounts of inert solid diluents of somewhat larger particle size such as diatomaceous earth, carbon black, tetrafluoroethylene beads, etc. of for example 30 mesh to 200 mesh, U.S. particle size produces columns which permit more rapid flow through the column at lower pressures and greatly enhances the utility of the diamantiferous adsorbent when so diluted. Such columns provided a mechanical mixture of the components which operated satisfactorily when freshly prepared, but in which the much smaller diamond particles tended to settle out and become packed together in at least some portions of the column and eventually resulted in reduced flow or the requirement of higher pressures.

It is an object of the present invention to provide a diamantiferous chromatographic column packing of high adsorptivity which permits rapid flow of gas therethrough at low pressures, and which has virtually no tendency to compaction with use over a period of time.

Another object is to provide a diamantiferous chromatographic column packing which is capable of regeneration at elevated temperatures up to 1,000° C. or higher without damage to the adsorptivity of the packing material.

These and other objects are accomplished according to our invention wherein a new column packing material is provided which comprises particulate crystalline calcium fluoride ($CaF_2$) having a particle size between about 210 microns and about 590 microns (30–70 mesh U.S.) and a surface area, for example on the order of about 0.15 square meter per gram, having deposited and superimposed thereon and tightly adherent thereto, between about 1.0% and about 20% by weight (based on the total weight of the composite mixture) of synthetic particulate diamantiferous material composed of polycrystalline aggregates of individual diamond particles, said aggregates having an average particle diameter not exceeding about 0.15 micron and a surface area of between about 40 and about 400 meters per gram, and usually being made up of individual diamond crystallites having average particle diameters between about 50 A. and about 300 A.

In the drawings, FIGURE 1 represents a photomicrograph at magnification of 140 times, of a calcium fluoride crystal, at least partially coated with much smaller diamond crystals, the latter being present to the extent of about 10% of the total $CaF_2$/diamond composition.

Figure 2:
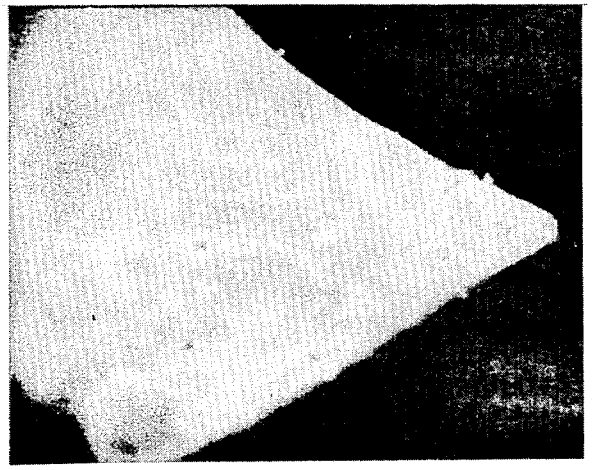

FIGURE 2 is a photomicrograph at 150× magnification showing a calcium fluoride crystal with adhering diamond particles, the latter being present to the extent of about 1% of the total composition.

The new composite column packing material of my invention appears to be composed of the particles of calcium fluoride coated with the much smaller diamond particles adsorbed thereon and tightly adherent thereto. The diamond particles, surprisingly, are not separated therefrom by shaking or other forces to which the material is subjected in the column. The nature of the forces holding the diamond particles and $CaF_2$ particles together is not understood. However, amounts of diamantiferous particles of the character described, up to about 20% by weight of the composite calcium fluoride-diamond mixture (a ratio of 1 part diamond to 4 parts $CaF_2$), are thus adsorbed and tenaciously retained by the calcium fluoride. At ratios greater than about 1:4, separation of an apparent excess of the diamond particles occurs.

The composite column packing of our invention is prepared by adding the diamond powder slowly with gentle stirring to the calcium fluoride crystals particles and then gently shaking the resulting mixture to insure even distribution of the diamond on the $CaF_2$ without danger of further comminution of the $CaF_2$ crystals. Using the above technique, distribution of the adsorbed diamond powder upon the $CaF_2$ particles appears to be surprisingly uniform even when small proportions (e.g. 1%) of diamond are added.

The calcium fluoride suitable for use as a base material in our composite column packing material can be obtained from fluorite mineral ($CaF_2$) purified by igniting the mineral to about 900° C., to remove water, organic matter, and other volatilizable impurities, whereupon it is readily crushable to a powder of the particle size mentioned above.

The synthetic diamantiferous material which forms the coating on the calcium fluoride particles is preferably that described in copending application of Francis J. Figiel and Raffaele F. Muraca, Ser. No. 485,392, filed Sept. 7, 1965. Such diamantiferous material is composed of finely divided individual diamond particles having a hydrophilic surface exhibiting acidic properties. It can be prepared according to the above application by subjecting "shock loaded graphite," i.e. graphite which has been exposed to shock pressures and temperatures within the range of diamond stability, and thus containing fine diamond particles to oxidation with nitric acid at temperatures of at least about 280° C., preferably above 300° C., at atmospheric pressure. The finely divided diamantiferous material thus produced has an average particle diameter not exceeding about 0.15 micron (1500 A.), made up of diamond crystallites of particle diameters usually between about 50 A. and about 300 A., which may be present in aggregates of about 500 A. to about 1500 A., and the particles have a surface area between bout 40 and about 400 square meters per gram. As originally produced as described above, the surface area of the diamond particles contains functional groups including hydroxyl, carboxyl and carbonyl groups usually to the extent of at least about 10% of their surface area. The diamantiferous material containing these functionl groups is useful per se in our invention in producing chromatographically effective composite $CaF_2$-diamond column compounds. If desired, however, most or all of the surface groups can be removed, as by heating at 600°–1,000° C. in a non-oxidizing atmosphere to produce a diamond product having virtually no surface groups or containing greatly reduced concentrations of such groups. The product which results after the heating step is equally as effective chromatographically as the original oxidized product. This is important, since it permits regeneration of the column by heat if it becomes contaminated with adsorbed material not readily eluted at lower temperatures.

The resulting composite $CaF_2$-diamond material is an exceptionally useful column packing material not only because of the high adsorbtivity and releasability of a wide variety of fluid materials by the diamond powder, but because of the high temperature stability of both the diamond and its $CaF_2$ support which readily withstand temperatures up to at least 1,000° C. and are inert to many of the most reactive of gases including fluorine, hydrogen fluoride, chlorine trifluoride, oxygen difluoride and many others. The composite product does not agglomerate under pressure and has an extremely low coefficient of expansion.

The following specific examples further illustrate the invention. Parts are by weight except as otherwise noted.

Example 1.—Separation of $F_2$ and HF

A sixteen foot 1/8″ O.D. nickel chromatographic column was packed with calcium fluoride based diamond powder consisting of 90% $CaF_2$ of 210–590 micron particle size (30–70 mesh U.S.) coated with 10% diamond powder of particle diameter 50 A. to 300 A. (.005–.03 micron) having a surface area of about 200 square meters per gram. The column was placed into a standard chromatographic analyzer. The column was connected to a source of helium gas from which a split stream of gas was flowing, one portion through the reference side of the detector, the other portion flowing through the column and exiting through the sample side of the detector. Helium flow was maintained in each of the streams at 80 ml./minute at a pressure of 30–35 p.s.i.g. A gaseous sample consisting of a mixture of 30 parts $F_2$ and 1 part of HF by volume was injected into the helium gas stream just prior to its entry into the column. The components of the sample gas were retained on the column for different retention times and when released, passed through the sample side of the detector and were recorded by separate peaks which showed the following retention times.

| Component: | Retention time, seconds |
|---|---|
| $F_2$ | 30 |
| HF | 210 |

The chromatogram as recorded is shown in FIGURE 2.

Example 2.— Separation of HCl and HF

A mixture of 30 parts HF and 1 part gaseous HCl by volume was injected into the helium carrier stream flowing at 40 ml./minute and 30–35 p.s.i.g. through the 10% diamond, 90% $CaF_2$ column described in Example 1 above and the retention times of the components noted on the detector as before with the results shown below.

| Component: | Retention time, seconds |
|---|---|
| HCl | 120 |
| HF | 420 |

Example 3.—Separation of HF, HCl and $F_2$

A sample composed of 30 parts of HF, 1 part HCl and a trace (less than 1 part) of $F_2$ was injected into the helium stream, flowing at 40 ml./min. at 35–40 p.s.i.g. of the chromatographic apparatus described in Example 1. Upon elution from the column, the following retention times were observed.

| Component: | Retention time, seconds |
|---|---|
| $F_2$ | 70 |
| HCl | 120 |
| HF | 400 |

The chromatogram obtained in the above separation is shown in FIGURE 3 of the drawings.

Example 4

A sample of chlorine trifluoride ($ClF_3$) prepared by the reaction of chlorine and fluorine was analyzed for character and extent of impurities by injecting a sample thereof into the helium carrier stream, flowing at 30 ml./minute at 30–35 p.s.i.g. of the chromatographic apparatus described in Example 1.

The resulting chromatogram revealed components having the retention times and probable identities shown below.

| Compound: | Retention time, seconds |
|---|---|
| $F_2$ or ClF | 90 |
| $HF \cdot ClF_3$ | 190 |
| $ClF_3$ | 330 |

The areas of the several peaks of the chromatogram were 1.0%; 4.1%; and 94.8% respectively, indicating approximately 5% impurities of which the major proportion appeared to be $ClF_3 \cdot HF$ complex.

Example 5

A two foot long 1/8″ O.D. copper column was packed with an 85% calcium fluoride, 15% diamond mixture, the components of which are of the same character as those described in Example 1. The column was "pacified" by passing through it a mixture of $ClF_3$ and $F_2$ at 25° C.

for 120 minutes. Helium gas was then passed through the column, flow being adjusted to 60 ml./minute at 30–35 p.s.i.g. A gaseous mixture of $F_2$ and $WF_6$ was injected into the flowing helium stream and thereafter was eluted and detected on the recorder.

| Compound: | Retention time, seconds |
|---|---|
| $F_2$ | 30 |
| $WF_6$ | 240 |

Example 6

A ten foot column of ⅛" O.D. copper tubing was packed with a mixture of 15% diamond powder and 85% calcium fluoride (30–70 mesh U.S.), the components of the mixture being the same as described in Example 1 above. The column was placed into a standard chromatographic analyzer (F & M 500) and maintained at a temperature of 25° C. Helium carrier gas was passed through the column at 35 ml./min. at 30–35 p.s.i.g. A mixture of equal parts by volume of tetrafluoroethylene and vinyl fluoride contaminated with a small amount of air was injected into the helium stream and was passed through the column and through the detector and a chromatogram was recorded. Retention times and approximate peak areas of the components are shown below, the latter in terms of percent of total area under all peaks.

| Component | Retention time (sec.) | Peak areas percent |
|---|---|---|
| Air | 50 | |
| $CF_2=CF_2$ | 120 | 32.3 |
| $CH_2=CHF$ | 245 | 67.7 |

Example 7

Using the same column and apparatus as described in Example 6 above except for a helium gas flow of 20 ml./minute and a column temperature of 70° C., a mixture of equal parts dichlorodifluoromethane and perfluorocyclobutane, contaminated with a small quantity of air, was injected into the helium stream and passed through the column and detector. A chromatogram was taken. Retention times of the components and their respective peak areas are shown below.

| Compound | Retention Time (sec.) | Peak areas, percent |
|---|---|---|
| Air | 60 | |
| $CCl_2F_2$ | 180 | 54.1 |
| $C_4F_8$ | 300 | 45.9 |

Example 8

A 10 foot ⅛" O.D. copper tube was packed with a mixture of 99% $CaF_2$ (30–70 mesh U.S.) and 1% diamond powder of the character described in Example 1. The column was placed in the standard chromatographic analyzer (F & M Model 500). Helium gas was passed through the column at 35 ml./minute at 30–35 p.s.i.g. while the column was maintained at ambient temperature (Ca 25° C.). A mixture of approximately equal parts by volume of dichlorodifluoromethane and perfluorocyclobutane was injected into the helium stream and successively adsorbed, eluted and passed through the detector. A chromatogram was recorded. Retention times of the components and areas beneath the recorded peaks are shown below.

| Compound | Retention time (sec.) | Areas in peaks, percent |
|---|---|---|
| Air | 35 | |
| $CCl_2F_2$ | 45 | 45.9 |
| $C_4F_8$ | 70 | 54.1 |

It will be noted that the areas of the peaks made by the $CCl_2F_2$ and $C_4F_8$ are substantially equal, thus confirming by analysis the known composition of the adsorbed sample.

Example 9

30 foot stainless steel ⅛" O.D. column was packed with a mixture of 15% diamond, 85% $CaF_2$, both components being of the character described in Example 1 and placed in the standard chromatographic apparatus. Helium gas flow of 55 ml./min. at 30–35 p.s.i.g. was established, temperature was maintained at about 25° C., and into this gas was injected a small sample of oxygen difluoride $OF_2$. A retention time of 6 minutes was observed for the $OF_2$.

Examples 10–12

Three gaseous mixtures of the approximate compositions shown below were passed with helium carrier gas through the 15% diamond, 85% $Ca_2$ column described in Example 6 and under the same conditions there described and showed retention times set out below.

| Example No. | Component | Percent | Retention time, sec. |
|---|---|---|---|
| 10 | $NO_2$ | 50 | 60 |
|  | $CO_2$ | 50 | 135 |
| 11 | $CO$ | 10 | 60 |
|  | $CO_2$ | 90 | 120 |
| 12 | $NO_2$ | 50 | 60 |
|  | $NO$ | 50 | 90 |

While the above describes the preferred embodiments of the invention, it will be understood that departures can be made therefrom within the scope of the specification and claims.

We claim:
1. As a new composition of matter a composite, tightly adherent mixture of (A) between about 80 parts and about 99.0 parts of calcium fluoride of particle size between about 210 microns and about 590 microns and (B) between about 20 parts and about 1.0 part of a synthetic diamantiferous material composed of polycrystalline aggregates of individual diamond particles, said aggregates having an average diameter not exceeding about 1500 A. and a surface area between about 40 and about 400 square meters per gram.
2. The composition of claim 1 wherein the diamond particles have an average diameter of about 50 A. to about 300 A.

References Cited

UNITED STATES PATENTS 3,345,804  10/1967  Mariani _____ 55—6

PATRICK P. GARVIN, Primary Examiner

U.S. Cl. X.R.
55—67; 252—444